United States Patent [19]

Havens et al.

[11] Patent Number: 4,808,078

[45] Date of Patent: Feb. 28, 1989

[54] PUMP CONTROL SYSTEM FOR INSTANTLY REVERSING THE DRIVE MOTOR

[75] Inventors: Terry L. Havens, Wenona; Robert E. Park, Metamora, both of Ill.

[73] Assignee: Phoenix Park Systems, Wenona, Ill.

[21] Appl. No.: 104,767

[22] Filed: Oct. 5, 1987

[51] Int. Cl.$^4$ .................. F04B 49/00; F04B 49/08; B65B 57/00

[52] U.S. Cl. ........................... 417/38; 417/45; 141/116

[58] Field of Search ............... 417/45, 199 A, 435, 417/315, 325, 317, 540; 141/115, 116; 318/763, 764; 415/53 R

[56] References Cited

U.S. PATENT DOCUMENTS

| | | | |
|---|---|---|---|
| 1,827,416 | 10/1931 | Birdsall | 141/116 X |
| 1,920,749 | 8/1933 | Hutt | 417/45 X |
| 1,927,799 | 9/1933 | Mann | 417/203 |
| 2,886,756 | 5/1959 | Schaefer | 318/763 |
| 3,269,325 | 8/1966 | Schwed et al. | 415/53 R |
| 3,578,880 | 5/1971 | Cygnor | 417/199 A |
| 3,767,987 | 10/1973 | Mitsui et al. | 318/764 |
| 4,067,663 | 1/1978 | Brooks et al. | 417/199.2 |
| 4,634,347 | 1/1987 | Gauffin et al. | 417/45 |
| 4,643,650 | 2/1987 | Khakzad-Ghami | 417/108 X |
| 4,687,982 | 8/1987 | Palaniappan | 318/763 |

FOREIGN PATENT DOCUMENTS 2097485 11/1982 United Kingdom .............. 417/413

Primary Examiner—William L. Freeh
Attorney, Agent, or Firm—Marshall, O'Toole, Gerstein, Murray & Bicknell

[57] ABSTRACT

A liquid flow system comprising a bidirectional liquid pump, a bidirectional electric motor coupled to drive the pump, and a liquid flow line having the pump connected therein. The system further comprises a motor control circuit connected to power the motor in either the forward or the reverse direction. The control circuit includes a switch for connecting the motor windings to the power lines, the switch being operable to instantly reverse the power connections when the motor is operating in the forward direction and thereby powering the motor-pump to an instant stop and then immediately powering the motor in the reverse direction. The pump thereby instantly reverses the liquid flow in the flow line and abruptly terminates the flow. To quickly start the flow again in the forward direction later on, a priming loop is connected to the pressure side of the pump, so that the pump is able quickly to develop pump pressure.

7 Claims, 1 Drawing Sheet

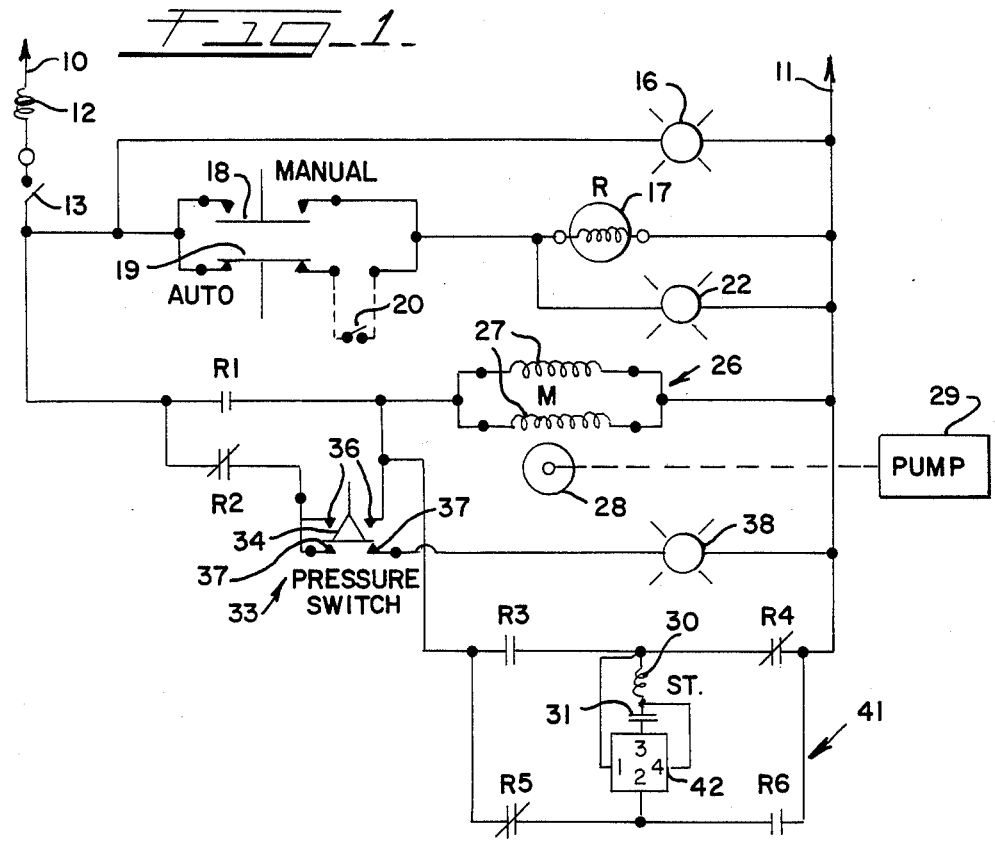
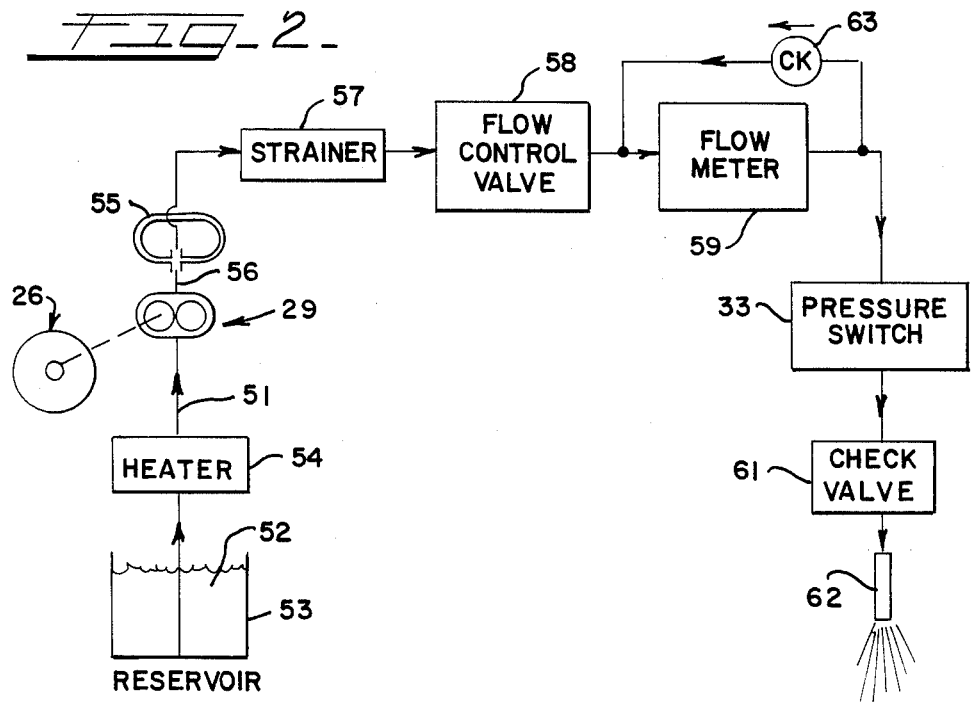

PUMP CONTROL SYSTEM FOR INSTANTLY REVERSING THE DRIVE MOTOR

FIELD AND BACKGROUND OF THE INVENTION

This invention relates to apparatus for supplying and controlling the flow of a liquid, particularly in a dust suppression system.

Prior art systems are known for suppressing dust in grain handling installations by spraying oil on the grain. In such a system, the grain is flowed in a steam, and oil in the form of small droplets is sprayed on the grain. The oil wets the grain including the dust particles and causes the particles to stick to the grain kernals. The oil is, of course, an edible form such as white mineral oil or soy bean oil. By suppressing the dust, the danger of an explosion is reduced, the working place is cleaner and healthier, air ventilation systems may be reduced, and the dust purchased with the grain is maintained in the grain.

In such an operation it is advantageous to be able to start and stop the flow of oil as abruptly as possible, in coordination with the starting and stopping of the stream of grain. If the oil starts to flow after the start of the stream of grain, some of the grain may be left unsprayed; if the grain stream stops but the oil dribbles for a time, there is a waste of the oil and perhaps some grain with excessive oil or a puddle of oil.

It has been difficult in prior art systems to abruptly stop the flow of oil. An on-off flow control valve could be connected in the line and turned off to stop the flow, but oil between the valve and the spray nozzle would slowly dribble out of the nozzle after the valve has been turned off.

A prior art system has been provided wherein a pump is used to develop oil pressure and a bidirectional electric motor drives the pump. To stop the oil flow, the direction of rotation of the motor and the pump is reversed, the purpose being to develop a reverse liquid flow in order to stop the oil spray. A problem with this system is that the electric power to the motor is turned off until the motor and the pump stop, and then the electric power (with opposite polarity) is turned on again to drive the motor-pump in the opposite direction. While this arrangement is an improvement over a system that relies on an on-off flow control valve, some oil still dribbles and is lost during the time that the motor-pump comes to a stop and then is powered again in the reverse direction.

It is a general object of the present invention to provide an improved system for controlling liquid flow, wherein the flow may be started or stopped more abruptly than in prior art systems.

SUMMARY OF THE INVENTION

This invention relates to a liquid flow system comprising a bidirectional liquid pump, a bidirectional electric motor coupled to drive the pump, and a liquid flow line having the pump connected therein. The system further comprises a motor control connected to power the motor in either the forward or the reverse direction. The control includes a switch for connecting the motor windings to the power lines, the switch being operable to instantly reverse the power connections when the motor is operating in the forward direction and thereby powering the motor-pump to an instant stop and then immediately powering the motor in the reverse direction. The pump thereby instantly reverses the liquid flow in the flow line and abruptly terminates the flow. To quickly start the flow again in the forward direction later on, a priming loop is connected to the pressure side of the pump, so that the pump is able quickly to develop pump pressure.

BRIEF DESCRIPTION OF THE DRAWING

The invention will be better understood from the following detailed description taken in conjunction with the accompanying figures of the drawing, wherein:

FIG. 1 is a schematic diagram of the electrical portion of a flow-control system in accordance with the present invention; and FIG. 2 is a diagram of the hydraulic or liquid-flow portion of the system.

DETAILED DESCRIPTION OF THE DRAWING

With reference first to the electrical diagram shown in FIG. 1, the numerals 10 and 11 indicate two power input lines which are connectable to a conventional AC power supply such as a 60 hertz, 110 volt supply. The line 10 is connected to a circuit breaker or fuse coil 12 and to a manually operable power on-off control switch 13.

Connected across the two lines 10 and 11 is a power-on indicator light 16 which is energized when the on-off control switch 13 is closed in order to indicate that the power has been applied to the system. A relay coil 17 has one side connected to the line 11 and its other side is connected to the line 10 through either a manual control switch 18 or an automatic control switch 19. To set the system for manual operation, the switch 18 is closed and the other switch 19 is opened, and, of course, to set the system for automatic operation, the switch 19 is closed and the manual switch 18 is opened. When the system is set for manual operation and the switch 18 is closed, the relay coil 17 is connected across the two lines 10 and 11 and the coil is energized. When the system is set for automatic operation, the switch 19 is closed and another switch 20, which is connected in series with the switch 19, controls the energization of the relay coil 17. The switch 20 may be an external control switch such as a limit switch which is automatically opened and closed in response to some external operation or other factor. The switch 18 is connected in parallel with the series combination of the switches 19 and 20 so that energization of the relay coil 17 is under the control of either of the switches 18 or 20. A relay indicator light 22 is connected in parallel with the coil 17 and is energized whenever the power is supplied to the relay coil 17.

Coupled to the relay coil 17 are six sets of relay contacts which carry the designations R1, R2, R3, R4, R5 and R6. The contacts R2, R4 and R5 are normally closed when the coil 17 is not energized and the other three contacts are normally open. Of course, the conditions of all six sets of contacts reverse when the coil 17 is energized.

An electric motor indicated generally by the numeral 26 includes two parallel main windings 27 and a rotor 28. The rotor 28 is mechanically coupled to drive a pump 29 which is also shown in FIG. 2. The motor 26 also includes a start-winding 30 and a capacitor 31, the motor in this instance being a single phase capacitor-start induction motor.

The two main windings 27 are connected in series with the contacts R1 and across the two lines 10 and 11, so that the current flows through the windings 27 when the switch 13 is closed and the relay 17 is energized. The relay contacts R2 are connected between the line 10 and a pressure switch 33 which is also shown in FIG. 2. When high hydraulic pressure is present in the liquid flow portion of the system, the pressure causes the movable contacts 34 (FIG. 1) to move upwardly to a position where a connection between high pressure contacts 36 is closed. On the other hand, when the liquid pressure in the system is low, the contacts 34 are in a lower position where a connection is formed between low pressure contacts 37.

As shown in FIG. 1, the high pressure contacts 36 of the pressure switch 33 are connected in series with the relay contacts R2 and across the relay contacts R1. The other low pressure contacts 37 are connected in series with the contacts R2 and a low pressure indicator light 38, the contacts R2 and 37 and the light 38 being connected across the two power input lines 10 and 11.

The relay contacts R3-R6, the start-winding 30 and the start-capacitor 31 form part of a direction control circuit 41 which also includes an instant reverse switch 42. The switch 42 may, for example, be a switch sold under the trademark SINPAC, sold by PT Components, Inc., Stearns Division. This company is located at 120 North Broadway, Milwaukee, Wis. The switch 42 has four terminals, 1, 2, 3 and 4. The terminal 2 is connected to the juncture between the contacts R5 and R6, the terminal 1 is connected to the juncture between the contacts R3 and R4, the terminal 3 is connected to the capacitor 31, the start-winding 30 and the juncture between the contacts R3 and R4, and the terminal 4 is connected to the juncture between the capacitor 31 and the start-winding 30. The contacts R4 and R6 are also connected directly to the power input line 11 and respectively to the contacts R3 and R5. The other sides of the contacts R3 and R5 are connected together and to the juncture between the relay contacts R1 and the windings 27 of the motor 26.

Considering first the operation of the electrical system shown in FIG. 1 (the liquid-flow system of FIG. 2 will be discussed hereafter), assume that the power lines 10 and 11 are connected to a power supply and the control switch 13 is manually closed. Assume further that the system is set for manual operation wherein the switch 18 is closed and the automatic switch 19 is open. As soon as the on-off control switch 13 is closed (or if the switch 13 is closed, as soon as the switch 18 is closed), the relay coil 17 is energized and the two lights 16 and 22 turn on. The relay contacts R1, R3 and R6 close and the contacts R2, R4 and R5 open. With the contacts R1 closed, the motor windings 27 are connected directly across the two power lines 10 and 11.

At the instant of startup, the pressure in the liquid flow system shown in FIG. 2 is low and consequently the movable element 34 of the pressure switch 33 is in the lower position where the contacts 37 are closed. Since the contacts R2 are open, the low pressure indicator light 38 is off even though the contacts 37 are closed. The direction control circuit 41 is connected to the line 11 and through the closed contacts R1 to the line 10, and consequently current flows through the start-winding 30 through the contacts R3 and R6, through the capacitor 31 and through the switch 42. With the main windings 27 energized and the start-winding 30 energized through the switch 42, the motor 26 starts to rotate in the forward direction and drives the pump 29. When the motor reaches approximately 80% of the normal running speed, the switch 42 automatically cuts out the start-winding 30 and the capacitor 31, and the motor continues to run on the main windings 27. As will be described hereinafter, the pump 29 quickly develops pressure in the system and this pressure causes the movable element 34 of the pressure switch to move to the high or upper position where the contacts 37 are open and the contacts 36 are closed. However, since the relay contacts R2 are open, this change in the condition of the pressure switch 33 does not alter the operation of the electrical portion of the system.

Now assume that it is desired to abruptly terminate the liquid flow through the flow system shown in FIG. 2. This is accomplished by manually opening the switch 18, and this action deenergizes the relay coil 17 and the relay indicator light 22. The contacts R1, R3 and R6 then revert to their normally open conditions whereas the contacts R2, R4 and R5 revert to their normally closed positions. At this instant the pressure in the liquid flow line is still high and the pressure switch 33 has the contacts 36 closed. When the relay contacts R2 close, the main windings 27 are connected across the lines 10 and 11 through the contacts 36 and the relay contacts R2. The control circuit 41 is connected across the lines 10 and 11 through the closed contacts 36 and the closed contacts R2. However, the polarity to the switch 42 and the start-winding 30 is reversed through the now closed contacts R4 and R5. The switch 42 senses the change in the polarity and instantly reconnects the start-winding 30 and the capacitor 31 to the power circuit even though the motor is running at above the normal cutout speed of the start winding. Thus, the motor is instantly powered in the reverse direction toward a stop even though it is initially still turning in the forward direction, and the motor comes to an abrupt stop due to the instant reversal of the polarity. The liquid pressure in the hydraulic system downstream from the pump drops as the electric motor and the pump come to an abrupt stop and then are driven in the reverse direction, due to the instantaneous reversal of the polarity in the control circuit 41. Since the pump 29 is instantly driven in the reverse direction, it pumps the liquid in the reverse direction and the pressure in the hydraulic line downstream of the pump abruptly drops. When the pressure falls to a low value, the pressure switch 33 then changes from the high pressure or upper position to the low pressure condition where the contacts 37 are closed. As soon as the contacts 36 open, the power is disconnected from the main windings 27 and from the control circuit 41 including the start-winding 30, thereby causing the motor to be deenergized and the pump 29 to come to a complete stop. With the pressure switch 33 in the low pressure position where the contacts 37 are closed, the low pressure indicator light 38 is turned on but the relay light 22 is turned off. The power-on light 16 is still turned on so long as the switch 13 is closed.

Subsequently, if it is desired to develop forward pressure in the hydraulic system once again, the switch 18 is manually closed and the foregoing sequence of events is repeated.

The foregoing discussion assumes that the system is set for manual operation wherein the switch 18 is manually closed and opened and the automatic switch 19 is opened. If, on the other hand, the system is set for automatic operation, the switch 19 is closed and the switch 18 is left open. The system is then under the control of the external control switch 20 which, when closed, starts the motor in the forward direction, and when opened, causes the motor to reverse its direction of rotation and then stop, as described above with regard to the operation of the system with the manual operation. The switch 20 may, for example, be a limit switch which is automatically operated.

FIG. 2 shows the hydraulic portion of the system. The pump 29 is a positive displacement type, and a gear pump is illustrated. Such a pump preferably includes an internal pressure relief valve which operates to hold the discharge pressure at a preset value such as 110-120 psi. The gear pump 29 is coupled in a liquid flow line 51 which is connected to draw a liquid 52 from a reservoir 53. In the present specific example, a heater 54 is connected in the line 51 between the reservoir 53 and the pump 29 in order to control the viscosity of the liquid. On the discharge or pressure side 56 of the pump is connected a priming loop 55 which is formed by a length of tubing having both ends connected to the pressure side 56 of the pump. The liquid leaving the pump 29 flows through a strainer or filter 57, through a flow volume control valve 58, a flow meter 59, the pressure switch 33, a check valve 61 and out of a spray nozzle 62. The flow meter 59 has connected across it a one-way check valve 63 which is connected to handle a reverse direction of liquid flow.

The flow control valve 58 may be a needle valve which may be manually adjusted to control the volume or rate of liquid flowing to the nozzle 62. The flow meter 59 may be a Hedland flow meter which indicates the volume of liquid flowing to the nozzle 62. Since this type of meter can handle flow only in the forward direction, the check valve 63 is needed. The pressure switch 33 is, of course, discussed in connection with FIG. 1. The check valve 61 may be a diaphragm-type which is set to open or close at a preselected pressure, such as 7 to 10 psi. It is preferred that the pressure switch 33 shift to the low pressure position at a lower pressure than valve 61 closes.

Assuming that the motor 26 is energized in the forward direction as described in connection with FIG. 1, the pump 29 is driven and draws the liquid 52 from the reservoir and pumps it through the line 51. As soon as the pressure in the line 51 exceeds the opening pressure of the valve 61, the liquid is sprayed from the nozzle 62. The liquid discharged by the pump 29 also fills the loop 55.

In the event it is desired to abruptly terminate the liquid flow from the nozzle 62, the direction of rotation of the motor 26 is reversed as described in connection with FIG. 1, and the reversal of the pump 29 abruptly causes the pressure in the line downstream from the pump 29 to fall below the open-close pressure of the valve 61 and terminate the liquid flow. The pump 29 reverses the direction of liquid flow from the nozzle and the liquid bypasses the flow meter 59 through the check valve 63, but the loop 55 remains filled with the liquid. If the system is turned off for a time after the motor 26 stops, the liquid in the portion of the line 51 between the pump 29 and the reservoir 53 may drain back into the reservoir 53. The loop 55 is positioned higher than the pump 29 and the connection of the loop to the pump discharge. Consequently the liquid contained in the priming loop 55 flows down into the pump 29 and a sufficient amount of the liquid remains in the pump 29 due to the loop 55 so that, when the motor 26 is subsequently energized, the liquid in the pump 29 will cause a priming action and the pump 29 will quickly operate and generate liquid pressure in the line 51.

While the system has been illustrated and described in connection with spraying oil on grain in order to suppress dust, it should be understood that the invention also has utility in other hydraulic systems. The invention is useful in any system where the flow is required to be started or stopped abruptly without the use of an on-off flow control valve.

It will therefore be apparent that a novel and useful system has been provided for controlling the flow of a liquid. With the motor control circuits illustrated in FIG. 1, the motor and the pump are powered to an abrupt stop from the forward direction and then immediately powered in the reverse direction in order to reverse the direction of fluid flow in the line and thereby abruptly terminate the flow of the liquid without a flow control valve. On the other hand, when the system is turned on to begin the flow of the liquid, the priming loop 57 operates to quickly start the system.

What is claimed is:

1. A liquid flow control system comprising a liquid flow line, a positive displacement pump connected in said flow line for pumping a liquid therethrough, a bidirectional electric motor coupled to drive said pump in forward and reverse directions, first and second power input lines adapted to be connected to an electric power supply, control circuit means connecting said motor with said power input lines in one polarity for powering said motor in one direction and pumping the liquid in the forward direction in said pump and then instantly reversing said polarity while said motor is turning in said one direction for powering said motor to turn in the reverse direction and pumping the liquid in the reverse direction in said pump, and pressure responsive means connected in said flow line and connected to said control circuit means for disconnecting said power input lines from said power supply when said motor is powered in said reverse direction and the liquid pressure in said flow line is at a predetermined low pressure.

2. A system as set out in claim 1, wherein said control circuit means includes a relay comprising a relay coil and a plurality of relay contacts operated by said coil, said relay contacts connecting said motor with said power input lines in one polarity when said relay coil is energized and reversing said polarity when said relay coil is not energized.

3. A system as set out in claim 1, wherein said pump has a discharge side, and further including a priming loop separate from said flow line connected to said discharge side, said priming loop comprising a length of open tube having both ends connected to said discharge side, said tube being at a higher level than said discharge side.

4. A system as set out in claim 3, wherein said pump is a gear pump.

5. A liquid flow control system comprising a liquid flow line, a pump connected in said flow line for pumping a liquid therethrough, a bidirectional electric motor coupled to drive said pump, first and second power input lines adapted to be connected to an electric power supply, control circuit means connecting said motor with said power input lines in one polarity for powering said motor in one direction and then instantly reversing said polarity while said motor is turning in said one direction for powering said motor to turn in the reverse direction, said control circuit means including a control switch connected to reverse said polarity while said motor is turning, and further including a pressure responsive means connected to respond to the liquid pressure in said flow line and including a pressure switch, said pressure switch having a high pressure position wherein it connects said motor to said power input lines and a low pressure position wherein it disconnects said motor from said power input lines while the motor is turning in said reverse direction and the pressure in said flow line is below a preselected value.

6. A liquid flow system comprising a positive displacement pump, a liquid flow line, said pump having a discharge side connected to said line, and a priming loop comprising a length of open tube having both ends connected to said discharge side, said tube being separate from said flow line and at a higher level than said discharge side.

7. A system as set out in claim 6, wherein said pump is a gear pump.

* * * * *